United States Patent [19]
Eggert

[11] 4,105,814
[45] Aug. 8, 1978

[54] PROFILE STRIP OF U-SHAPED CROSS-SECTION, IN PARTICULAR AN EDGE PROTECTION STRIP FOR AUTOMOBILE

[75] Inventor: Frank Eggert, Hamburg, Fed. Rep. of Germany

[73] Assignee: Schlegel GmbH, Hamburg, Fed. Rep. of Germany

[21] Appl. No.: 780,919

[22] Filed: Mar. 24, 1977

[30] Foreign Application Priority Data

Jul. 14, 1976 [DE] Fed. Rep. of Germany ....... 2631568
Mar. 27, 1976 [DE] Fed. Rep. of Germany ....... 2613193

[51] Int. Cl.² .......................... B32B 3/02; E04C 2/38
[52] U.S. Cl. ..................... 428/122; 52/716; 428/100
[58] Field of Search ................. 49/490, 491, 496, 440, 49/441; 52/716; 428/31, 100, 122

[56] References Cited

U.S. PATENT DOCUMENTS

| 2,188,815 | 1/1940 | Murphy | 428/182 |
|---|---|---|---|
| 3,363,390 | 1/1968 | Crane et al. | 52/716 |
| 3,465,080 | 7/1969 | Meadows | 52/716 |
| 3,507,085 | 4/1970 | Kruschwitz | 52/716 |
| 3,527,013 | 9/1970 | Kruschwitz | 428/122 |
| 3,638,359 | 2/1972 | Kruschwitz | 49/490 |
| 3,742,649 | 7/1973 | Doehnahl | 49/491 |
| 4,010,573 | 3/1977 | Andrzejewski | 428/122 |
| 4,030,245 | 6/1977 | Yolmans | 49/490 |

FOREIGN PATENT DOCUMENTS

| 566,019 | 11/1958 | Canada | 428/122 |
|---|---|---|---|
| 1,285,449 | 1/1962 | France | 52/716 |
| 1,088,228 | 10/1967 | United Kingdom | 428/122 |
| 1,102,045 | 2/1968 | United Kingdom | 52/116 |
| 1,188,633 | 4/1970 | United Kingdom | 428/122 |

Primary Examiner—James C. Cannon
Attorney, Agent, or Firm—Cumpston & Shaw

[57] ABSTRACT

A profile strip of U-shaped cross-section is disclosed having two spaced apart arms connected by a base. The arms and base define a chamber for receiving a flange. An adhesion element is provided on at least one of the arms. The adhesion element is held against the flange when the profile strip is mounted thereon, and is further supported on a support surface connected to the one arm. During removal of the profile strip from the flange, the adhesion element rolls on the support surface tending to narrow the chamber.

15 Claims, 14 Drawing Figures

PROFILE STRIP OF U-SHAPED CROSS-SECTION, IN PARTICULAR AN EDGE PROTECTION STRIP FOR AUTOMOBILE

This invention relates to a profile strip of U-shaped cross-section having two arms connected by a base, and defining a chamber for receiving a flange and having, on at least one of the arms, an adhesion element which is held against the flange and is supported on a support surface connected to the respective arm and tends to narrow the chamber during removal of the profile strip from the holding flange.

Profile strips of this type are used, in particular in automobiles, as edge protector strips or holding profiles for sealing strips. It is required that these can be pushed onto the flange with a force which is smaller than that necessary for pulling them off the flange. For this purpose, known profile strips are provided with internal gripper fins fixed along one edge to a support surface which, in most cases, is formed by the inner surface of a profile arm (facing the chamber), whilst the free end of the gripper fin, under a pre-tension, bears against and adheres to the flange onto which the profile strip has been pushed. If an attempt is made to pull the profile strip off the flange or a force which splays the profile arms is exerted, the fin tends to straighten up in a direction which narrows the chamber. The holding force exerted by the fin on the flange then also increases.

However, the holding force which, in practice, can be exerted by such a fin is limited since in most cases the flange slides relative to the fin without the latter straightening up noticeably. In order to effect a straightening-up of the fin from its position which initially is almost parallel to the holding flange, it would indeed be necessary to exert a large force on the tip of the fin in the direction of movement of the holding flange, but the contact force of the fin on the flange is frequently inadequate to supply this force. This applies particularly at elevated temperatures. Therefore, it can happen that edge protection strips are detached from an automobile body flange when the latter is subjected to elevated temperatures in the course of it being painted.

It is thus the object of the present invention to provide a profile strip of the above described type, which requires only a small force to fit to a flange, but which generates large holding forces when attempts are made to remove it.

This is achieved according to the invention by designing the adhesion element to roll on the support surface and arranging the cross-sectional shapes of the support surface and of the adhesion element such that the centre of the adhesion element describes a path approaching the opposite arm of the strip during rolling movement of the adhesion element towards the mouth of the strip.

Hitherto, it has been the aim firmly to fix the adhesion element to the support surface in order to enable it to transmit the holding forces to the profile strip. This principle is not followed by the invention, and the holding force is small during initial movement of the profile strip from the flange. However, the effect of this is that the adhesion element carries out a movement, in the course of which its clamping action is progressively increased. Since it moves on a path approaching the opposite arm, e.g. starts to roll, it tends to narrow the flange receiving chamber. In this way, an increasing clamping force is exerted on the flange in the transverse direction, and this clamping force is coupled with an increasing holding force in the longitudinal direction of the flange. Although the holding force of the element on the flange is small at the start of the rolling movement, it suffices to set the adhesion element into a rolling movement, because the resistance to rolling is also small. Therefore, the profile strip of the invention is more securely held on the flange than has been possible hitherto using the customary gripper fins.

Several known possibilities are available to those skilled in the art to fix the path of an element, which can roll, in the desired direction. Advantageously, the following three principles, separately or jointly, are used for this purpose.

Firstly, the adhesion element can be designed as a lip which can be wound up between the flange and the support surface, its diameter in the relaxed state being increased. While the lip is wound up, the diameter of the particular part of the lip being rolled increases. This increase in diameter results in the desired increase in the clamping action between the flange and the profile arm on which the lip is located.

Secondly, the support surface can be inclined — as viewed in the direction from the flange receiving chamber towards the opening of the U — towards the plane or surface of the flange. During rolling movement of the adhesion element, the space available for the adhesion element between the support surface and the flange is thus narrowed so that the clamping force is increased.

Thirdly, the adhesion element can have a cross-sectional shape which causes its diameter, measured transversely to the flange, to increase during rolling movement. Preferably, the adhesion element has an oval cross-section, one of its narrower ends being connected via a flexible portion to its respective arm. On insertion of the flange, the adhesion element is extended into a position in which its smallest diameter lies transverse to the flange and to the support surface of the respective arm. As the rolling movement progresses, the adhesion element progressively builds up until it is finally in a position with its largest diameter transversely to the flange. This process is similar to the straightening-up of the known gripper fins. However, it is different in principle inasmuch as the adhesion element of the present invention does not carry out a pivoting movement, but a rolling movement, as a result of which only small forces are necessary at the start of the process in order to induce the desired movement of the adhesion element.

In every case, the adhesion element in its position of minimum clamping force must bear against the flange under a certain tension in order to make it possible to initiate the movement of the adhesion element. This pretension, however, does not need to be large. If the adhesion element is designed as a lip which can be wound up, the tip of the lip should be curved in such a way that it bears against the flange steeply and under a pre-tension of such magnitude that, during separation of the profile strip from the flange, the tip of the lip adheres to the latter and can be rolled in. It is also very advantageous when the adhesion element is designed as a lip comprising a thickened part on the end of a flexible strip, which can roll and, when the flange has been inserted, bears on one side against the latter and on the other side, under tension, against the support surface. Appropriately, this part which can roll has a cross-sectional shape approximately a circle. During its rolling movement, it is wrapped into the flexible strip, the diameter being increased, or it rolls onto the flexible strip. In the latter case, the flexible strip can be considered to be the support surface for the thickened part, which can roll, at the end of the lip. It can be advantageous if the thickness of the flexible strip of the lip increases from its free end, or from the part which can roll and which is located at the end, up to its root fixed to the support surface, so that the increase in the clamping force is enhanced in this way.

In order to prevent the adhesion element which can roll from moving out of the flange receiving chamber and thus losing its clamping action, the adhesion element can be fastened to the support surface at a suitable distance from the mouth of the strip so that it is retained on the support surface with movement of the strip off the flange is initiated.

If the support surface is inclined towards the plane of the flange, it can appropriately be part of a rib which is rigidly fixed on an arm of the strip and extends into the flange receiving chamber and which advantageously consists of a material harder than that of the adhesion element. In particular, the support surface can be formed by the surface of the free flexible end of a rib, and a support on the respective arm of the strip can be provided for this free end of the rib, which support becomes active at the latest after the adhesion element has rolled a certain distance and, associated with this, the clamping force has increased.

If the support surface is inclined towards the flange, it can co-operate with the flange in direct adhesion in the narrowest area, thus formed of the flange receiving chamber, if the support surface carries at this point a soft, strongly adhering facing. This facing can then continue in the adhesion element fastened to the rib.

Advantageously, a material with good adhesion properties, such as a soft, elastomeric material, is selected for the adhesion element.

Of course, both arms of the strip can be provided with the adhesion elements according to the invention. However, it is in most cases more advantageous to fit the adhesion element to only one arm and to provide the other arm with one or more conventional gripper fins.

Several embodiments of the invention are now described by way of example with reference to the accompanying drawings, in which.

Figure 1:
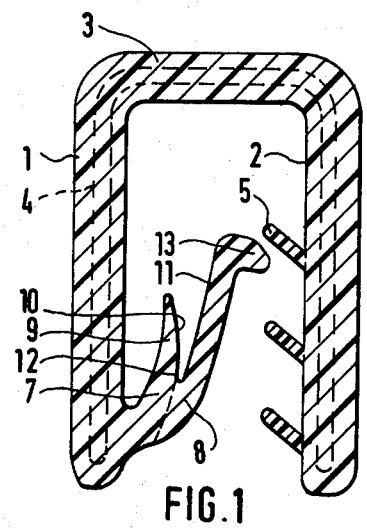
FIG. 1 is a cross-section through a first embodiment.

All the edge protection strips shown consist of two arms 1 and 2 and a base 3 connecting them; they are formed from a polymeric and optionally elastomeric, synthetic material or rubber with a metallic stiffening insert or carrier 4. However, they can also be constructed in a different way. In the illustrated embodiments, except that of FIG. 7, the arm 2 is provided with a group of gripper fins 5 which tilt more or less when the strip is placed on the flange 6. They compensate for variations in the thickness of the flange, participate in generating the holding force and impart to the arm 2 a position parallel to the flange 6.

In the embodiment of FIGS. 1–5, a relatively thick rib 7 is located on the arm 1. The rib 7 consists, like the arms 1 and 2 and the base 3, of a relatively hard material (illustrated by wide hatching), whilst the narrowly hatched parts consist of a soft elastomer. The rib 7, however, can also consist of a softer material if it has a correspondingly thicker dimension.

Figure 2:
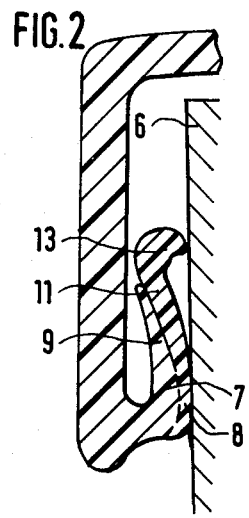
FIGS. 2–4 show partial views of the first embodiment, with a flange to which the strip is to be applied in different positions.

The rib 7 has a facing layer 8 which consists of soft material and can be relatively thin and which serves merely to increase friction in the mouth region of the rib 7 where the rib bears, by the facing 8, against the flange when the strip is fitted onto the flange in the normal way (FIG. 2). At this point, in the normal state, the arm 1 also exerts its highest clamping force on the flange 6.

The rib 7 extends into the flange receiving chamber towards the base 3 in the form of a tongue 9 which is thus resistant to collapse in spite of its smaller thickness. Its surface 10 forms a support surface for a lip 11 which is a continuation of the facing 8 and consists of soft, elastomeric material, and is joined to the rib 7 at 12. The lip 11 extends towards the base 3 and the arm 2, and its end 13 describes an arc which turns sharply towards the arm 2, the tip making contact at an acute angle with the surface of the flange 6 at 15 (FIG. 2).

Figure 3:
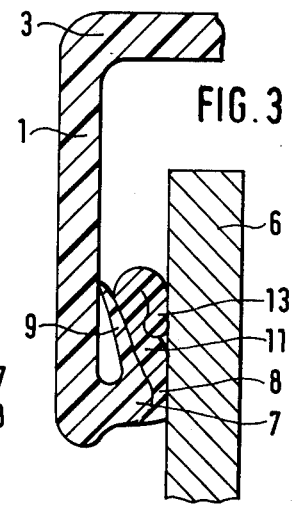
Figure 4:
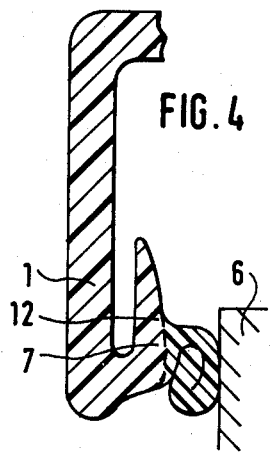

In the assembled state, compressive forces act between the rib 7, the tongue 9 and the lip 11 in the regions 8 and 13. In this way, the tongue 9 is pressed from its relaxed state of FIG. 1 closer to the arm 1 so that its support surface 10 encloses, with the surface of the flange 6, an outward-tapering, wedge-shaped space. When a force is applied to the strip to remove it from the flange (upwards in the drawing), the end 13 of the lip 11 adheres to the flange in the region 13 and begins to roll as shown in FIG. 3. Since, at this stage, the rolled-in region of the tongue moves into the wedge-shaped space between the support surface 10 and the flange, the clamping force is increased, and the tip of the tongue 9 makes contact with and is supported on the arm 1. During further movement of the strip, rolling-in of the lip 11 continues until a final state as shown in FIG. 4 is reached. Then the lip can no longer follow the movement of the flange 6 since it is fastened to the rib 7 at the point 12. In this final stage, the lip has reached its greatest rolled-up thickness, and is located on the part of the lip 7 which is closest to the flange. Thus, in this stage, it generates the highest clamping force on the flange 6.

Figure 5:
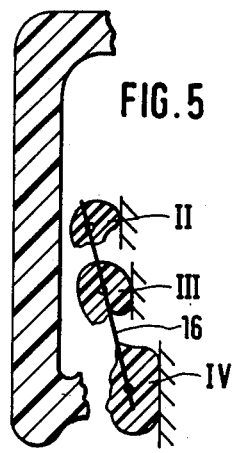
FIG. 5 is a diagrammatic representation of the position of the adhesion element of FIG. 1 in different stages of movement.

For comparison, the essential stages of movement are indicated in FIG. 5. In each case, the parts of the tongue 11 which are in contact with the flange and can be or have been wound are shown, specifically at the point II in the stage of FIG. 2, at the point III in the stage of FIG. 3 and at the point IV in the stage of FIG. 4. The centres of the particular parts which can roll are also indicated, as well as the path 16 on which they move during the relative movement of the strip and the flange. It can be seen that this path is inclined to the surface of the flange.

In FIG. 5, it will be observed that the distance between the flange and the arm 1 increases as the relative movement progresses. It is presupposed here that — as is generally customary — the profile strip can be elastically splayed, i.e. the U-shape opens out. The wider the mouth of the U, the stronger is the clamping force exerted on the flange 6.

In the above described embodiment the increasing clamping force results from the increase of the diameter of the lip being wound up and from the wedge effect of the inclined support surface. It will be understood that these effects can also be exploited individually. Thus, in the embodiment shown in FIG. 6, a support surface is formed by the inner surface of the arm 1, running approximately parallel to the surface of the flange, whilst a lip 21, (which is shown in dots and dashes in its relaxed state and with cross-hatching in solid lines after a certain relative movement between strip and flange), has a fairly uniform thickness and consists of a softer material — which can be seen from the narrower hatching — than the arm 1. Its tip 23 is bent towards the flange, as in the first embodiment, and bears against the latter under compression. The tip of the lip follows the flange as the strip is pulled off the flange so that the lip is rolled up and becomes increasingly thick. The increased clamping force results in higher friction at the opposite gripper fins 5. However, the lip 21 also exerts a retaining force since it tends to be deformed back into its relaxed position.

Figure 6:
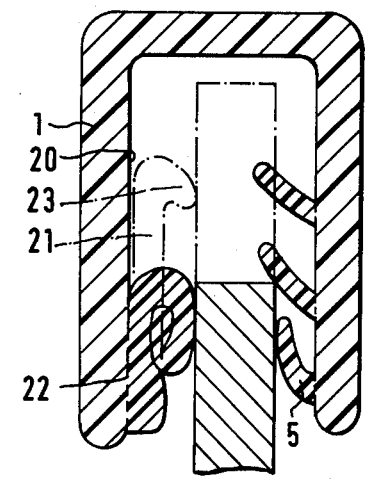
FIG. 6 is a cross-section of a second embodiment.
Figure 7:
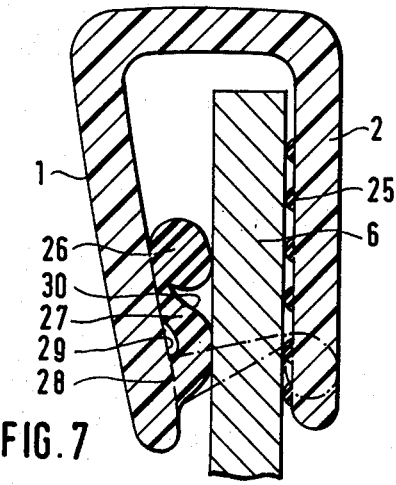
FIG. 7 is a cross-section through a third embodiment.

A similar situation occurs with the third embodiment shown in FIG. 7, which differs from that of FIG. 6 in that the lip has a thickened head 26 with a round cross-section and a portion 27 with increasing thickness from the head 26 up to its point of connection 28 on the arm 1, both the inner surface of the arm 1 and the inner surface 30 of the portion 27 being inclined towards the surface of the flange 6. The width of the mouth of the strip and the relaxed shape of the lip shown in dashes and dots are selected so that, in the normal state shown in FIG. 7, a holding force on the flange 6 results both in the contact region of the portion 27 and at the lip head 26. When the strip is initially pulled off the flange 6, the head 26 rotates clockwise and rolls up onto the inclined surface 30 of the portion 27 so that it tends to move towards the flange 6. In this way, the clamping force is increased in the desired manner. Moreover, the wound diameter of the lip increases since the portion 27 is wound up on the head 26.

In contrast to the other embodiments, the arm 2 in this embodiment is provided with small adhesion ribs 25 which, like the lip 26, 27, consist of softer material than the arms 1, 2 and have a high coefficient of friction against the surface of the flange 6.

Figure 8:
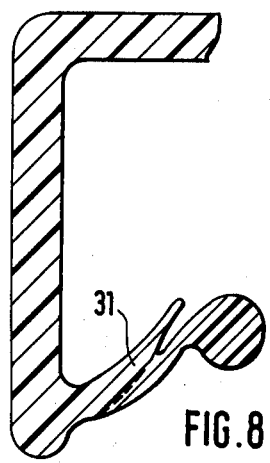
FIGS. 8 and 9 are cross-sections of a fourth embodiment in two different operational stages.
Figure 9:
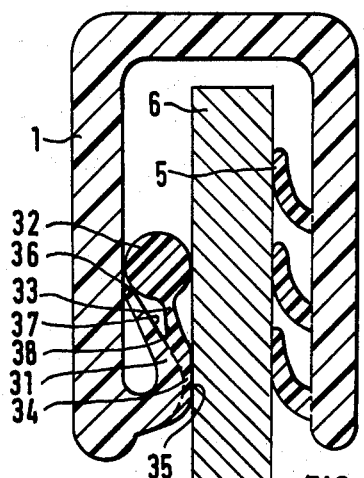

In the fourth embodiment shown in FIGS. 8 and 9, the adhesion element is located on a rib 31, of the same relatively stiff material as the arm 1. It consists of a roll 32 of softer material, which is connected to the rib 31 by a portion 33 which likewise consists of softer material. The portion 33 continues in the form of a coating 34 into a region 35 which bears against the flange 6 in the normal state (FIG. 9). It can be seen from a comparison of the relaxed position of the adhesion element (FIG. 8) with the normal position when the strip is applied to a flange (FIG. 9) that the region 34 bears against the flange 6 under considerable compression. The frictional contact thus effected in this region and on the opposite gripper fins 5 determines the retaining force existing in the rest state, the roll 32 not contributing, or in any case not materially contributing, to this force. In the rest state, the roll 32 is pressed by the tip 36 of the rib 31 against the surface of the flange, it being immaterial whether the tip 36 already bears in this position, as shown, against the inner surface of the arm 1. When the strip is initially pulled off the flange the roll 32 is rolled in between the flange and the inclined surface 37, serving as the support surface, of the rib 31. Due to the approach, associated therewith, of the roll to the flange and due to the increase of its diameter when the portion 33 is wound up, the clamping force is increased. Moreover, as movement of the strip off the flange progresses, the roll 32 increasingly approaches the root of the rib 31, so that the lever arm under which this rib presses the roll against the flange becomes increasingly shorter, and hence the contact pressure (additional to the wedge action) becomes increasingly larger. The point 38, where the junction between the portion 33 and the rib 31 terminates, is selected to agree with the criteria explained by reference to FIG. 4, so that the roll 32 cannot be moved outwards beyond the mouth of the strip.

Figure 10:
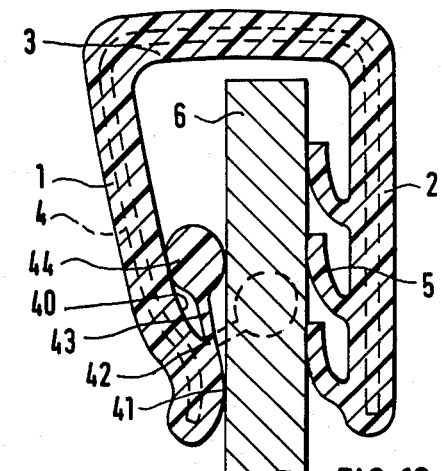
FIGS. 10, 11 and 12 show a fifth embodiment in different operational stages.
Figure 11:
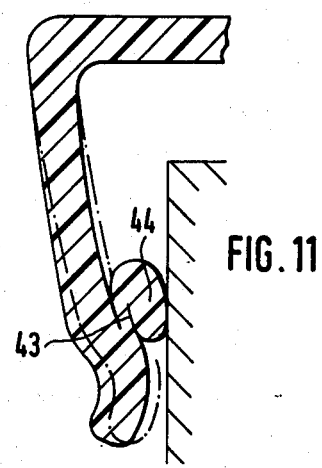
Figure 12:
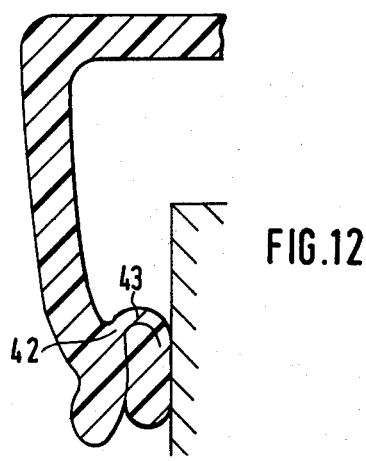

In the fifth embodiment shown in FIGS. 10–12, the strip consists throughout of the same relatively soft elastomer having rubber-elastic properties. Close to its free end, the arm 1 is inclined towards the flange 6 in such a way that a support surface 40 results, which is inclined to the surface of the flange 6 and converges outwards. At the mouth of the strip it ends at a point 41 at which the arm 1 bears against the flange 6. At 42, a thin bridge 43 which leads to a thickening 44 is connected to the arm 1 at a certain distance from the point 41. The relaxed position of the bridge and the thickening are indicated by dashes in FIG. 10. Conjointly, they form a holding lip to provide an adhesion element. On application of the strip to a flange 6, the holding lip assumes the position shown in full lines, in which it remains during the normal state. It is clamped in between the arm 1 at the end of the support surface 40 and the flange 6 under a certain compression under which the shape of its originally approximately circular cross-section is slightly ovally deformed. It is held in this position by the tensioned bridge 43. In its rest position, the retaining force acting between the flange 6 and the strip is largely determined by the friction at the point 41, at the lips 5 and (only to a slight extend) at the roll 44. If this retaining force is overcome by a pull off force acting on the strip, the roll 44 adheres to both the flange and the support surface 40 so that it rolls between these surfaces as is indicated to FIG. 11. Since the distance between the holding flange and the support surface decreases towards the mouth of the strip and, furthermore, the thickness of the roll 44 is increased by the thickness of the bridge 43, an increasing splaying force is exerted on the strip; conversely, an increasing clamping force from the strip acts on the roll 44. In this way, not only is the retaining action of the gripper fins 5 enhanced, due to the increased frictional force, but the roll 44 itself also exerts a retaining action on the flange 6 since a part of the clamping force applied by the strip to the inclined support surface 40 is converted into a retaining component which is directed inwards and transmitted from the roll 44 to the flange 6 by friction. The larger the angle between the support surface 40 and the surface of the flange, the larger also is this retaining component. However, a certain maximum angle, above which reliable frictional contact between the roll 44 and the holding flange 6 is no longer ensured, must not be exceeded.

Maximum splaying is attained at the stage of FIG. 12 when the roll 44 reaches the narrowest point 41 of the mouth of the strip. However, this is also a critical point inasmuch as there is a danger that the roll 44 is moved beyond this point and thus loses its retaining force, resulting from the inclination of the support surface 40. This is precluded by arranging the point 42 so far inwards of the point 41 that the bridge 43 is tensioned as soon as the roll reaches this critical position and thus prevents a further outward movement of the roll. The retaining force is then determined by the static friction of the flange on the roll 44 and on the gripper fins 5 under the clamping force increased by the widening of the mouth of the strip.

As a rule, profile strips are preferred, the body (arms and base) of which consist of relatively stiff material, the flexibility and coefficient of friction of which are not adequate for the adhesion elements of the invention. A softer material which has a high coefficient of friction and is extruded integrally with the body, is then used for the adhesion elements. Junctions between materials of different hardness are marked by dots.

Figure 13:
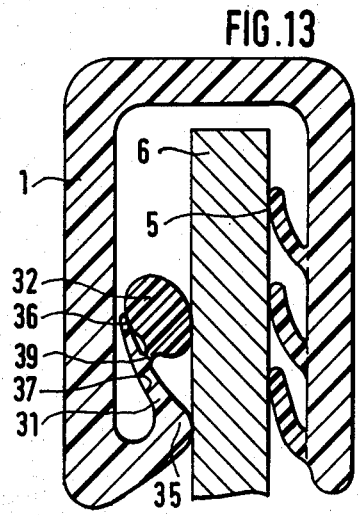
FIG. 13 shows a sixth embodiment.

Whilst, in the example of FIG. 9, the portion 33 is wound onto the roll 32 as movement of the strip off the flange progresses and the diameter of the roll is thus increased, only a very short bridge 39 between the rib 31 and the roll 32 is provided in the example of FIG. 13. During the movement of the strip, the roll 32 rolls on the surface 37 of the rib and thus pivots about the point formed by the short bridge 39 without its diameter being increased as the result of winding. Nevertheless, the effect remains substantially the same, including the retaining action when the roll approaches the narrowest region 35 of the mouth of the strip. For this reason, the embodiment of FIG. 13 can otherwise resemble that of FIGS. 8 and 9. A facing of soft material can also be provided in the region 35, in order to increase the frictional effect between the rib 31 and the flange 6.

Figure 14:
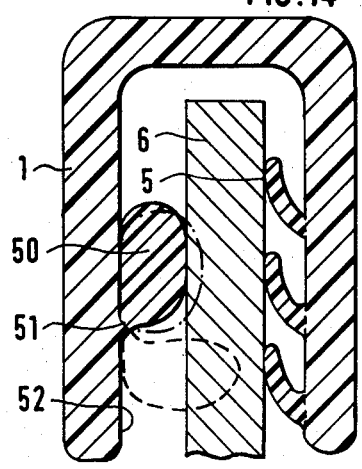
FIG. 14 shows a seventh embodiment.

In the construction of FIG. 14, a roll 50 consists of soft material, and its relaxed form is indicated by dashes and dots. The roll 50 is joined by a short bridge 51, acting as a hinge point, to the inner surface 52 of the arm 1 of the strip. The surface 52 may extend substantially parallel to the surface of the flange 6. The roll 50 has an oval shape, the hinge point 51 being located approximately at the end of the long diameter. When the strip is mounted on the flange 6, the roll assumes the shape shown by solid lines. When the strip begins to move off the holding flange the roll 50 rolls between the flange and the surface 52, its diameter, which in the relaxed state is in a position transverse to these surfaces, steadily increasing. It thus exerts a splaying action on the strip, and an increase in the retaining force results from this, which is at a maximum when its largest diameter is transverse to the holding flange, as is indicated by dashes (in the relaxed state). The splaying action and the adhesion of the gripper fins 5 then reach maximum. The roll can exert a retaining force in particular when, as shown in dashes — the bridge 51 resists further rotary movement of the roll or when a support surface is located on the mouth side of the roll, impeding further movement of the latter.

The principle of the non-circular roll according to FIG. 6 is appropriately used in combination with a support surface extending in the shape of a wedge (FIG. 9 or FIG. 13).

It is common to all the illustrated embodiments that the strip can be pushed onto a flange 5 with little assembly force, since the adhesion element of the invention in its rest state causes almost no frictional resistance, whereas, during pulling of the strip off the flange, it generates a splaying action which exceeds that of any holding elements hitherto known. For example, it is possible by suitable choice of dimensions to arrange for the ratio of pull off force to push on force to be from 5 to 1 to 10 to 1.

What is claimed is:
1. A profile strip of U-shaped cross-section having two spaced apart arms and a base connecting said arms, said arms and said base together defining a chamber for receiving a flange through the mouth of said chamber;
   an adhesion element on at least one of said arms, said adhesion element being held against the flange when the profile strip is mounted thereon;
   a support surface connected to said at least one of said arms having said adhesion element, said support surface arranged to cooperate with said adhesion element to exert increasing pressure on the flange during removal of the profile strip from the flange wherein (1) said adhesion element is designed to roll on said support surface, and (2) the cross-sectional shapes of said support surface and said adhesion element are such that during rolling movement of said adhesion element towards said mouth of said chamber said adhesion element tends to describe a path approaching the arm opposite said at least one of said arms.

2. Profile strip according to claim 1, in which said adhesion element is firmly located on said support surface at a point spaced from the mouth of said strip so that it is retained towards the mouth end of said support surface during movement of the profile strip off the flange.

3. Profile strip according to claim 1, in which said adhesion element consists of a soft elastic material.

4. Profile strip according to claim 1, in which said adhesion element has an oval cross-section and one narrower end is connected via a short, flexible bridge to said support surface.

5. Profile strip according to claim 1, in which said adhesion element is designed as a lip which can be rolled up between the flange and said support surface, its diameter in the relaxed state being increased.

6. Profile strip according to claim 5, in which the tip of said lip when the strip is mounted on a flange, terminates in a sharp convex curve which bears against said flange so that, during a movement of the strip from said flange, the tip of said lip adheres to the latter and is rolled up.

7. Profile strip according to claim 1, in which said adhesion element is designed as a lip having a thickened part on the end of a flexible portion, which part can roll and, when said strip is mounted on a flange, bears on one side against the latter and on the other side, under compression against said support surface.

8. Profile strip according to claim 7, in which said flexible portion is located in such said way that it forms a support surface inclined towards said opposite arm of said strip on which said thickened part can roll.

9. Profile strip according to claim 8, in which the thickness of said flexible portion increases from the end of said lip to its point of connection to said support surface.

10. Profile strip according to claim 1 in which said support surface is inclined — when viewed from within said chamber towards its mouth — towards the surface of said opposite arm.

11. Profile strip according to claim 10, in which said support surface is part of a rib which is rigidly fixed on at least one of said arms of said strip and extends into said chamber.

12. Profile strip according to claim 11, in which said rib consists of a material which is harder than that of said adhesion element.

13. Profile strip according to claim 11 in which said lip is the continuation of a soft facing layer of said rib in the region where said rib bears against said flange.

14. Profile strip according to claim 11, in which said support surface is formed by the free, flexible end of said rib.

15. Profile strip according to claim 14, in which at least at an advanced stage of removal of said strip from said flange, a support for the free end of said rib is provided on said one arm of said strip.

* * * * *